United States Patent
Toda

(10) Patent No.: US 6,411,014 B1
(45) Date of Patent: Jun. 25, 2002

(54) CYLINDRICAL TRANSDUCER APPARATUS

(75) Inventor: Minoru Toda, Lawrenceville, NJ (US)

(73) Assignee: Measurement Specialties, Inc.

( * ) Notice: Subject to any disclaimer, the term of this patent is extended or adjusted under 35 U.S.C. 154(b) by 0 days.

(21) Appl. No.: 09/566,612

(22) Filed: May 9, 2000

(51) Int. Cl.[7] .............................................. H01L 41/08
(52) U.S. Cl. ....................... 310/334; 310/324; 310/369; 310/800
(58) Field of Search ................................ 310/800, 334, 310/369, 326, 324

(56) References Cited

U.S. PATENT DOCUMENTS

| | | | | |
|---|---|---|---|---|
| 3,792,204 A | * | 2/1974 | Murayama et al. .......... | 310/322 |
| 3,832,580 A | * | 8/1974 | Yamamuro et al. ..... | 252/62.9 R |
| 3,862,477 A | * | 1/1975 | Ayers et al. ................ | 29/25.35 |
| 4,064,375 A | | 12/1977 | Russell et al. ............... | 179/110 |
| 4,486,869 A | * | 12/1984 | Carter .......................... | 310/800 |
| 4,558,249 A | * | 12/1985 | Lerch et al. ................. | 310/322 |
| 4,825,116 A | * | 4/1989 | Itoh et al. .................... | 310/326 |
| 5,357,486 A | | 10/1994 | Pearce ......................... | 310/800 |
| 5,361,240 A | * | 11/1994 | Pearce ......................... | 310/337 |

OTHER PUBLICATIONS

Schoenwald et al., "PVDF2 Transducers for Acoustic Ranging and Imaging in Air", IEEE Ultrasonics Symposium 1983, pp. 577–580.
I. Veit, "The Piezoelectric PVDF Film—Its Properties and Possibilties of Application in the Construction of Electroacoustic Transducers" AES preprint 2604 (G–1), Mar. 1988.
F. Harnisch, "Ultrasonic Transducers with Piezoelectric Polymer Film", Sensors & Actuators A. 25–27 (1994) 549–552.

\* cited by examiner

Primary Examiner—Nicholas Ponomarenko
Assistant Examiner—Karen Addison
(74) Attorney, Agent, or Firm—Duane Morris LLP

(57) ABSTRACT

An air transducer apparatus comprising a curved piezoelectric film having a first surface and a second surface opposite the first surface, a first electrode layer disposed on at least a portion of the first surface of the film; and a second electrode layer disposed on a portion of the second surface of the film defining the second electrode layer being sized less than the first electrode layer for generating a signal in response to acoustic energy incident on the piezoelectric film.

3 Claims, 14 Drawing Sheets

CYLINDRICAL TRANSDUCER APPARATUS

RELATED APPLICATIONS

This application is related to co-pending, commonly assigned U.S. patent application Ser. No. 09/281,398 entitled "OMNI-DIRECTIONAL ULTRASONIC TRANSDUCER APPARATUS HAVING CONTROLLED FREQUENCY RESPONSE", and co-pending and commonly assigned U.S. patent application Ser. No. 09/281,247 entitled OMNI-DIRECTIONAL TRANSDUCER APPARATUS AND STAKING METHOD, the subject matter of which is incorporated herein by reference in their entireties.

FIELD OF THE INVENTION

The present invention relates to the field of transducers, and more particularly to cylindrical PVDF ultrasonic airborne transducers.

BACKGROUND OF THE INVENTION

In the environment of ultrasound transducers, it is known that a curved transducer made of a polymer piezoelectric material such as PVDF and clamped at both ends may be used to form an audio or ultrasonic air transducer. Numerous examples of such may be found in the prior art references, such as M. Tamura, T. Yamaguchi, T. Oyabe and T. Yoshimi 'ELECTROACOUSTIC TRANSDUCERS WITH PIEZOELECTRIC HIGH POLYMER FILMS", J. Audio Eng. Soc. Vol. 23, No. 1, pp 21–26, (1975); R. Lerch and G. M. Sesler, 'MICROPHONES WITH RIGIDLY SUPPORTED PIEZOPOLYMER MEMBRANE", J. Acoust. Soc. Am. Vol. 67, No. 4, pp 1379–81, (1980); Jeff S. Schoenwald and Jim. F. Martin, "PVF2 TRANSDUCERS FOR ACOUSTIC PANNING AND IMAGING IN AIR.", 1983 Ultrasonic Symposium (IEEE), pp. 577–580; F. Harnisch, N. Kroemer, and W. Manthey, "ULTRASONIC TRANSDUCERS WITH PIEZOELECTRIC POLYMER FOIL", Sensors and Actuators A25–27, —549–552 (1991); S. Edelman and A. S. DeReggi "COMMENTS ON ELECTROACOUSTIC TRANSDUCERS WITH PIEZOELECTRIC HIGH POLYMER FILMS", J. Aoudio Eng. Soc vol. 24, No 7, pp. 577–578, (1976); I. Veit "THE PIEZOELECTRIC PVDF-FILM-ITS PROPERTIES AND APPLICATION IN ELECTROACOUSTIC TRANSDUCERS", Audio Eng. Soc., 84th Convention March 1988 1–4 paris 2604 (G-1); A. S. Fiorillo "DESIGN AND CHARACTERIZATION OF A PVDF ULTRASONIC RANGE SENSOR" IEEE Trans. Ultrasonics, Ferroelectrics and Frequency Control, vol. 39, No. 6, pp. 688–692(1992); R. Lerch, "ELECTROACOUSTIC TRANSDUCER USING PIEZOELECTRIC POLYVINYLIDENE FLUORIDE FILMS.", J. Acoust. Soc. Am Vol. 66, No. 4, pp. 952–954 (1979); W. Flugge "statik und Dynamik der Schalen" Springer, Berlin 1962; Hong Wang and Minoru Toda, "Curved PVDF Airborne Transducer", to be published; Leo L. Beranek "Acoustics", The American Institute of Physics, p. 119. 1986.

Referring now to FIG. 1A, there is shown a cylindrical piezoelectric film 54 having its stretched axis wrapped around a cylinder (not shown). Here, when a AC voltage is applied to electrodes 56 on surfaces of the cylindrical film 54, a lengthwise strain in the curved direction is converted to a film displacement normal to the surface (or vice-verse), due to the cylindrical film structure. Thus, a lengthwise strain in the curved direction is converted to radial vibration. Such a structure can be used as either a transmitter or a receiver with omni-directional angle performance. Depending on the application, often it is necessary to have transducers with limited angle performance (narrower directivity). In such a case, conventional transducers use two end clamped curved film structures as shown in FIG. 1B. However, in the known application of a curved film with two clamps, two significant problems are present. First, the resonance of the housing 22 on which the clamp is attached, reduces the stiffness of the clamp. One of many resonance modes of the housing structure are often coincident to the main resonance frequency of the curved film. The resonance of the curved film requires a very stiff clamp structure. Control of the housing resonance is thus very difficult and very sensitive to any minor variation of housing dimension, such that the output or sensitivity of each device is not reproducible and entirely non-uniform. Secondly, the thermal expansion coefficient of PVDF film is very high (approximately $120 \times 10^{-6}/C$, where the metal has a value of between $10 \times 10^{-6}/C$ and $20 \times 10^{-6}/C$, $10 \sim 20 \times 10^{-6}/C$). At relatively high temperatures (above approximately 45 C. for example) thermal expansion of the film severely deforms the film shape. This is because the clamp material, which has a much lower expansion causing deformation of the film and thereby creating film buckling around the cylinder. Once such buckling occurs, the film shape can not be restored to its original shape, even after the PVDF film is allowed to return to normal ambient temperature conditions.

In order to overcome these problems with clamped transducer structures, a non-clamp structure is disclosed in co-pending and commonly assigned U.S. patent application Ser. No. 09/281,398 entitled OMNI-DIRECTIONAL ULTRASONIC TRANSDUCER APPARATUS HAVING CONTROLLED FREQUENCY RESPONSE and co-pending and commonly assigned U.S. patent application Ser. No. 09/281,247 entitled OMNI-DIRECTIONAL TRANSDUCER APPARATUS AND STAKING METHOD disclose such non-clamped structures, the subject matter of which is incorporated herein by reference in their entireties. These documents disclose a non-clamped omni-directional transducer comprising a cylindrical PVDF film wrapped around a spool, where the film is spaced apart from a body portion of the spool to form a gap sized to enable the resonance frequency of the transducer to be controlled by the resonance frequency of the piezoelectric film.

In the above disclosures, the PVDF film included an electrode layer deposited over substantially the entire front surface of the film and a second electrode layer deposited on substantially the entire back surface of the PVDF film, except for the peripheral edges of the film in order to facilitate bonding. The angular performance of acoustic properties of PVDF transducers disposed onto a spool (either clamped or unclamped) is omni-directional. However, depending on the type of application, it is sometimes desirable to limit directivity of the beam angle to within a certain range. It is further desirable in certain instances, such as in the detection of low SNR signals, to obtain a receiver having increased sensitivity for detecting such signals. Still further, certain applications may make use of a wide band transducer having a relatively low Q factor and wider useful common frequency band between transmitter and receiver. A transducer capable of solving the aforementioned problems is highly desired.

SUMMARY OF THE INVENTION

The present invention modifies the structure of a cylindrical PVDF film material to obtain a desired angle performance.

It is an object of the present invention to provide an air transducer apparatus comprising a curved piezoelectric film having a first surface and a second surface opposite the first surface, a first electrode layer disposed on at least a portion of the first surface of the film; and a second electrode layer disposed on a portion of the second surface of the film defining the second electrode layer being sized less than the first electrode layer for generating a signal in response to acoustic energy incident on the piezoelectric film.

It is a further object of the present invention to provide an acoustic receiver comprising a cylindrical piezoelectric film having a first surface and a second surface opposite the first surface, the film responsive to acoustic energy incident thereon for vibrating at a given frequency; a first electrode layer disposed on the first surface of the film; a second electrode layer disposed on a portion of the second surface of the film; and a housing surrounding the piezoelectric film, the housing formed of a material resistant to the propagation of the acoustic waves, the housing having an aperture in alignment with at least a portion of the second electrode covering the film for influencing a receiving beam angle associated with acoustic radiation incident on the piezoelectric film through the aperture.

It is still a further object of the present invention to provide an acoustic transmitter comprising a cylindrical piezoelectric film having a first surface and a second surface opposite the first surface; a first electrode material disposed on the first surface of the film; a second electrode material disposed on the second surface of the film; means for exciting the film to generate omnidirectional acoustic waves at a resonance frequency; and a housing surrounding the piezoelectric film and formed of a material resistant to the propagation of the acoustic waves, the housing having an aperture exposing a portion of the second electrode covering the film to provide a directed acoustic wave output from the transducer.

Still further, it is an object of the present invention to provide a wideband transducer comprising a frame having a substantially cylindrical body portion, a substantially cylindrical piezoelectric film surrounding at least part of the frame body portion, the film spaced apart from the body portion to form a predetermined gap between the film and the body, the film having a first electrode layer disposed on a first surface of the film, and a second electrode layer disposed on a portion of a second surface of the film opposite the first surface. A loss of material is positioned within the predetermined gap and the film is excited so as to cause the film to vibrate at a resonance frequency. The resonance frequency becomes broader due to the loss of material which fills the gap.

DETAILED DESCRIPTION OF THE INVENTION

Figure 1A:
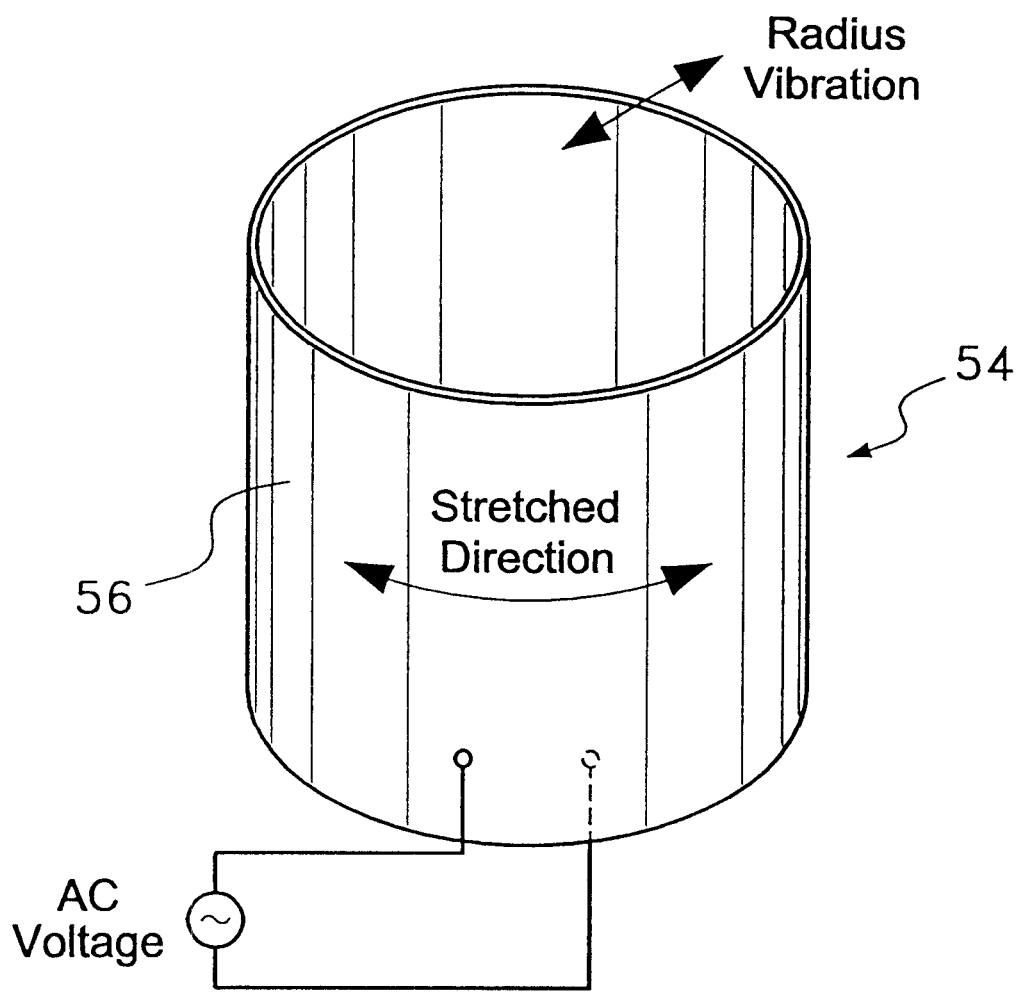
FIG. 1(a) is a perspective view of a PVDF film formed in a cylindrical shape and applied to a conventional spool in a clamped manner according to the prior art.
Figure 1B:
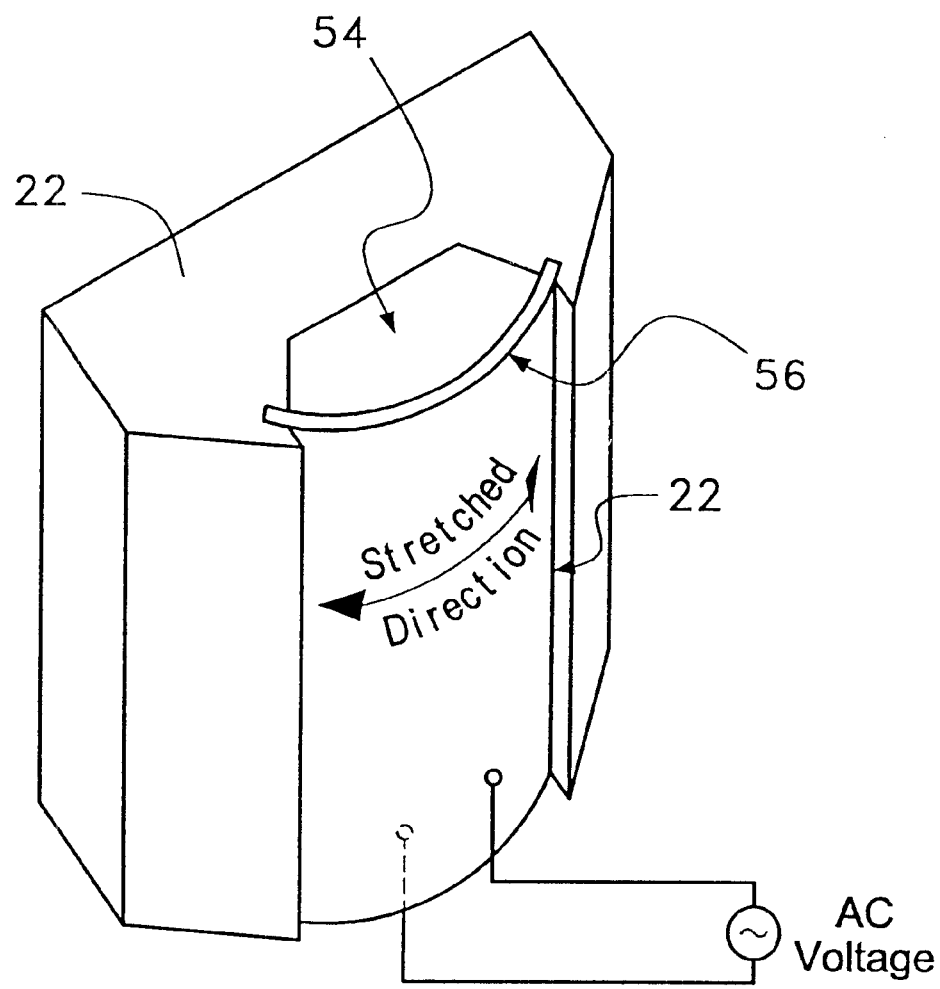
FIG. 1(b) is a perspective view of a curved clamped film structure according to the prior art.
Figure 2A:
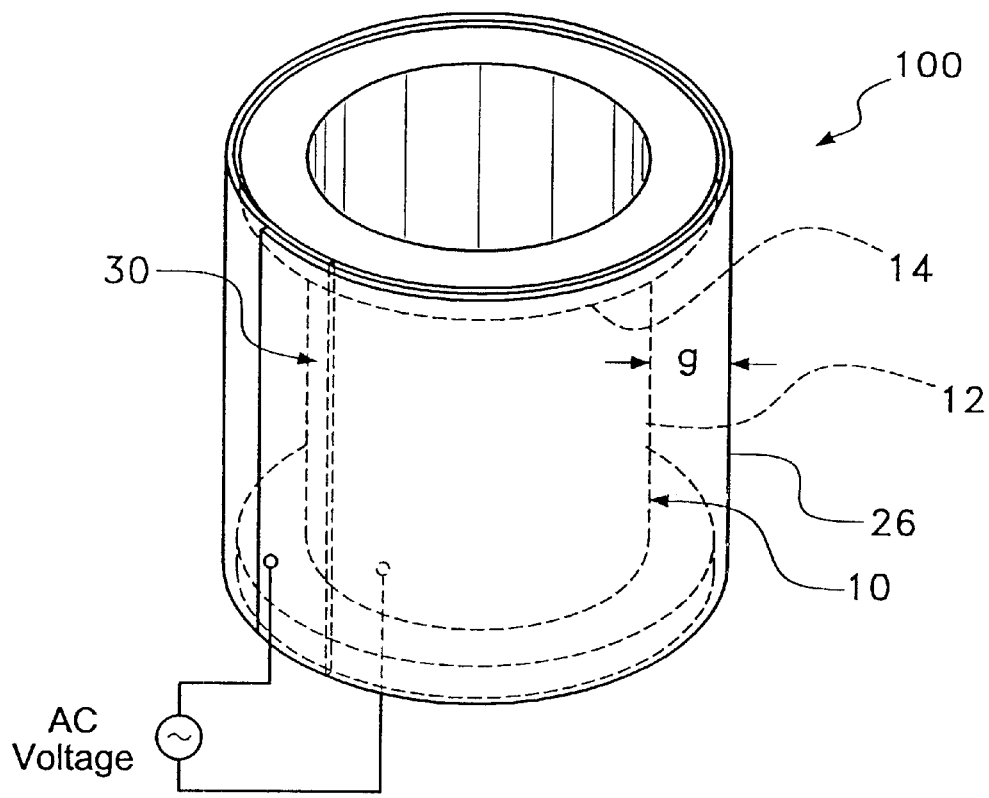
FIG. 2A shows an omni-directional ultrasound transducer for use as a transmitter.
Figure 2B:
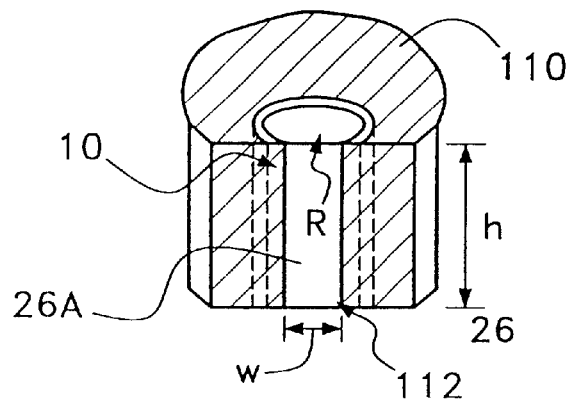
FIG. 2B shows the omni-directional ultrasound transducer of FIG. 2A with a housing surrounding the transducer and exposing a portion of the transducer to provide a directed beam angle ultrasonic transducer according to the present invention.

Referring now to FIGS. 2A and 2B, there is shown an ultrasonic transducer 100 for use as a transmitter in connection with the present invention. With reference to FIGS. 2A–B, 3 and 4, the ultrasonic transmitter 100 comprises a spool 10 having a cylindrical body portion 12 and a pair of elevated regions 14 surrounding the cylindrical body portion 12. The cylindrical body portion 12 has an outer peripheral surface 16, an inner surface 18, and opposite ends 20 (see FIG. 3). The inner surface 18 defines a longitudinal opening 22 of a uniform cylindrical shape corresponding to the shape of the cylindrical body portion 12. A sheet type piezo polymer film 26 such as a thin film PVDF material is wrapped around the spool to form a cylindrical shape for providing omni-directional transducer operation.

The elevated regions 14 of the spool 10 are integrally formed with the body portion 12 of the spool 10 and may be either of a one piece construction with the body portion 12 or attached to the body portion by suitable securing methods. As shown, there are two elevated regions 14. Each elevated region 14 is co-extensive with one of the opposite ends 20 of the cylindrical body portion 12 so as to extend therefrom and terminates in an outer edge 24 of the elevated region 14.

Figure 3:
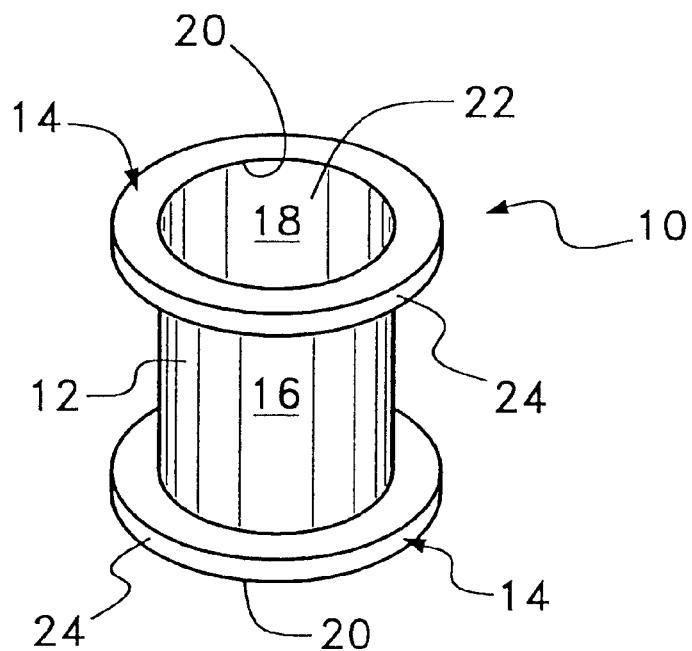
FIG. 3 is an exemplary embodiment of a spool useful in carrying out the present invention.

As shown in FIGS. 2 and 3, the elevated regions 14 are at opposite ends 20 of the cylindrical body portion 12. However, this arrangement should not be construed to eliminate the possibility of the elevated region 14 being set in from one or more opposite ends of the body portion of the spool 10. Furthermore, in the preferred embodiment the outer peripheral edge 24 of the elevated region 14 is at least 0.1 mm. from the outer peripheral surface 16 of the body portion 12. In addition, it is also contemplated that the spool or frame have, rather than elevated regions formed with the body portion, other extensions which may be used to support the piezoelectric polymer film about the spool body 12 so that the film is wrapped around the spool and offset a predetermined distance g from the body portion. For example, the spool may comprise a substantially cylindrical body portion and a base portion coupled to the body portion and extending radially outward a predetermined distance from the body portion. The PVDF cylinder may include for example, oppositely disposed tabs extending radially from a bottom portion of the PVDF cylinder so as to engage a portion of the base and to secure thereto while maintaining the gap g between the PVDF cylinder and the body portion.

Referring again to FIGS. 2A and 2B, piezoelectric polymer film 26 such as PVDF film is wrapped around the spool 10 and positioned to surround the outer peripheral edge 24 of the elevated region 14 (rather than being in direct surface contact with the body portion 12 of the spool). The edges of the film overlap one another and are secured to one another at reference numeral 30 (see FIG. 2A). Application of voltage such as an AC voltage causes a length of the PVDF film along the curved direction to vibrate and results in vibration of the radius of the cylinder of the PVDF film (i.e. "breathing" motion). Thus, the electric field induces a strain in the PVDF film along the machined direction of the film to which molecular chains are aligned. That film is wrapped around the spool so as to form the cylinder.

As shown in FIG. 2B, housing 110 is disposed around a portion of the cylindrical transducer in order to limit or restrict the acoustic beam direction which would otherwise emanate in an omni-directional fashion from the transducer to an intended destination. The housing 110 has an aperture 112 of width w and height h such that only a part of the PVDF cylinder 26A is exposed to allow an ultrasound wave to propagate normal to the surface of the exposed area. Note that a feature of ultrasound is that the wavelength is not very much smaller than the structural dimensions associated with the cylindrical transducer. Therefore, the wave does not necessarily emanate from the transducer surface in the normal direction. This is in contrast to that of an optical beam where the size of or structural dimensions of a lightsource is much larger than that of its wavelength, and the beam direction can be determined from geometrical optics.

Figure 4:
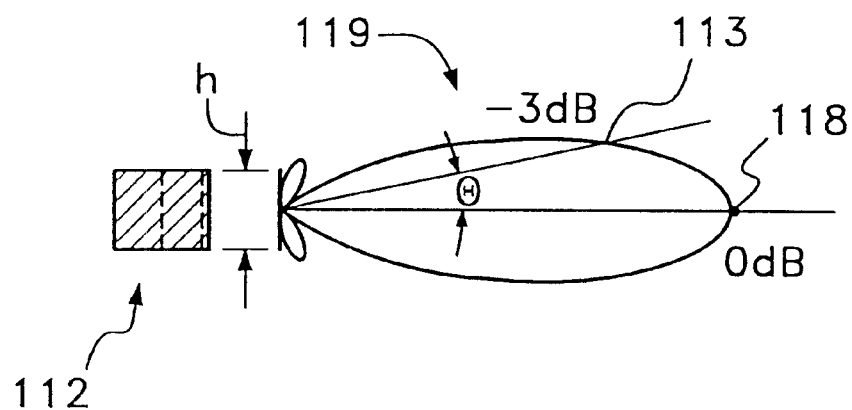
FIG. 4 provides a schematic illustration of the directivity pattern associated with the partially covered transmitter of FIG. 2B.

Referring again to FIG. 2B, the housing 110 which surrounds the cylindrical transducer except for the exposed portion 26A operates to restrict propagation of the ultrasonic wave emitted by the transducer except for the beam emitted through aperture 112. The housing 110 may be made of any solid material that does not allow propagation of an ultrasonic wave. Such examples of this type of material include plastics, metals, wood and other solid materials. The aperture 112 of housing 110 has a substantially uniform width w and height h. The width w corresponds to the dimension in the curved direction, while the height h corresponds to the dimension in the axial direction of the cylinder. The height h operates to determine the spread of the transmitted ultrasound beam in the vertical direction. As the height h is increased, the less the vertical direction of the beam spreads. In the preferred embodiment, the height of the cylinder and the height h of the housing aperture are equal. The width w determines the horizontal spread of the beam. When the width w is small, the beam spreads more due to diffraction effects. When w is large however, the beam becomes sharper and stronger. However, when w becomes too large, the beam spreads again due to the excited wave directed normal to the surface. FIG. 4 provides a schematic illustration of the directivity pattern associated with the partially covered transmitter of FIG. 2B. As shown in FIG. 4, aperture 112, having a height h, provides a given directivity pattern 119. Reference numeral 118 represents a 0 dB point associated with the directivity pattern, while reference numeral 113 represents the −3 dB point. As is understood, the larger the vertical aperture h becomes, the smaller the angle theta (ø).

Figure 5:
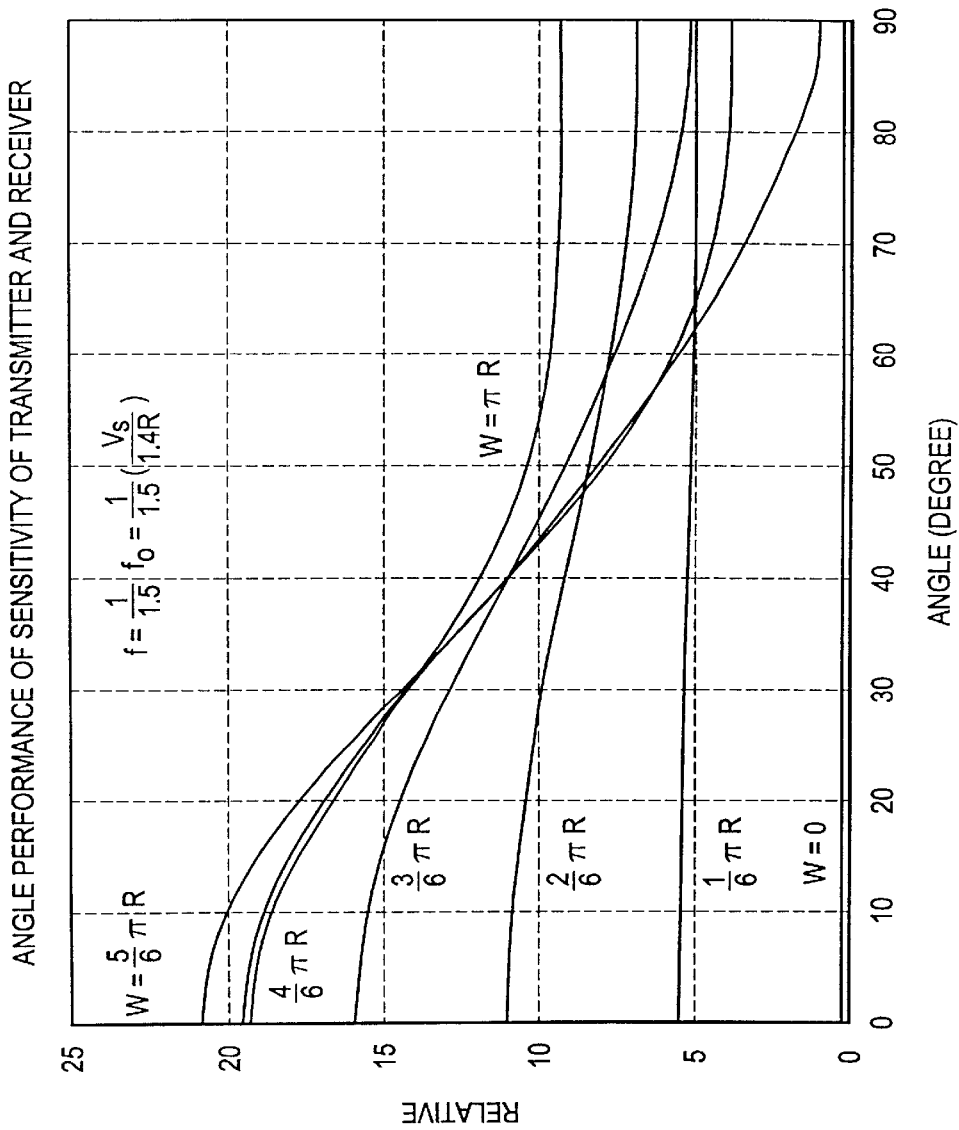
FIG. 5, 6, and 7 depict an example of a resonant frequency ($f_0$) transmitter where the drive frequency f is 120, 180, 270 KHz respectively.
Figure 6:
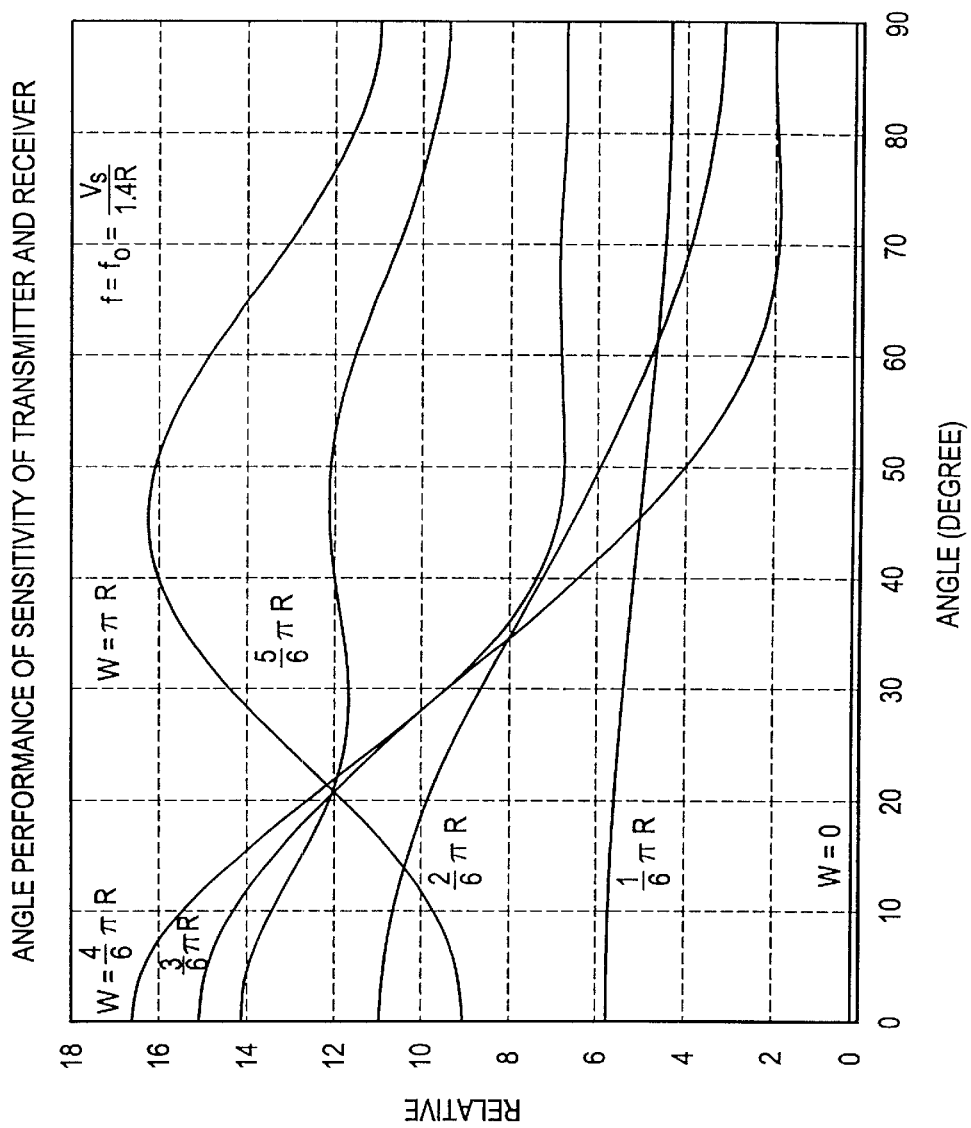
Figure 7:
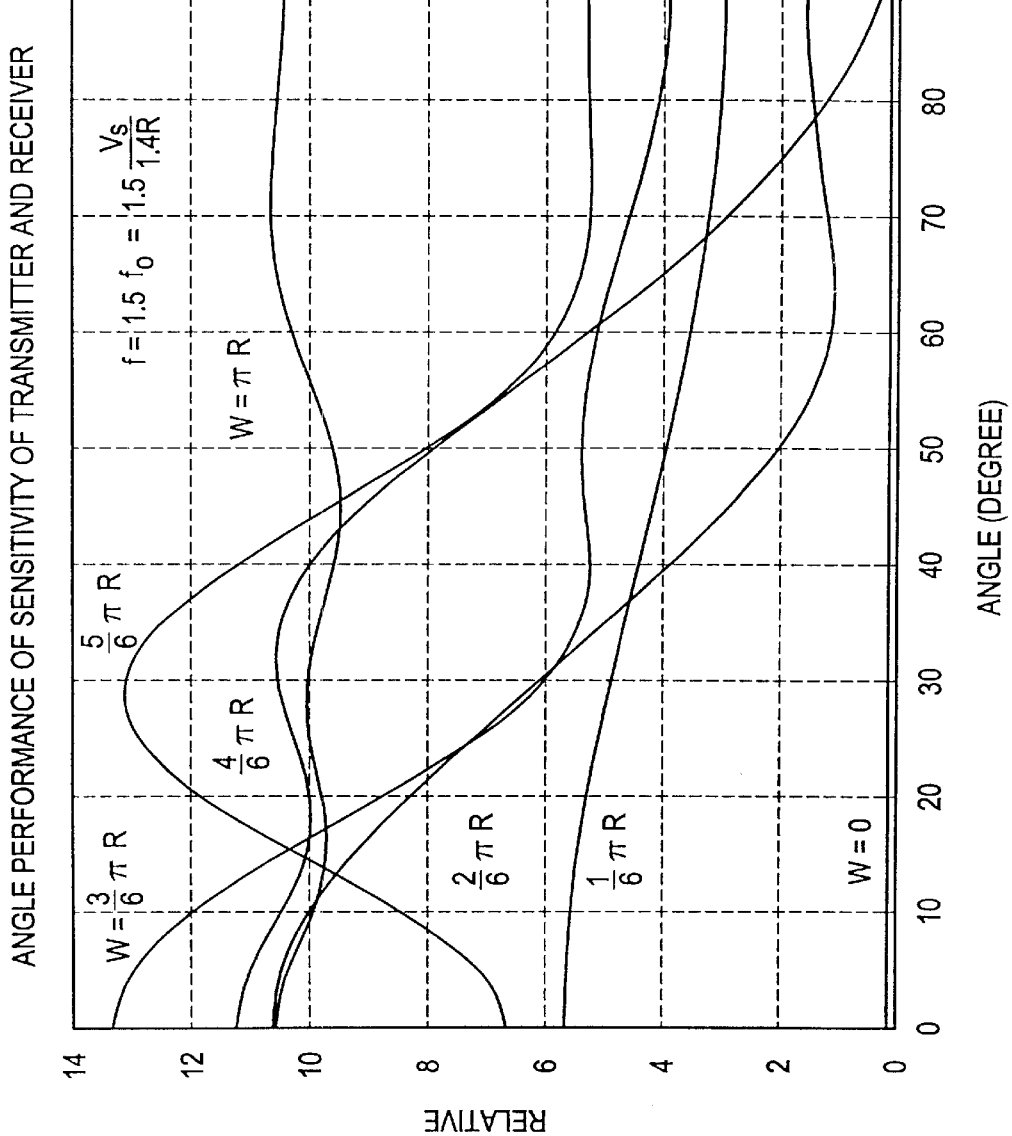

FIGS. 5, 6 and 7 depict an example of a 180 KHz resonant frequency ($f_0$) transmitter where the drive frequency f is 120, 180, 270 KHz respectively, and where the transmitter has a 2.7 mm diameter PVDF cylinder.

The resonance frequency of cylindrically curved PVDF is given by $$f_0 = \sqrt{Y/p}/(2\Pi R)$$

$\sqrt{Y/p} \sim 1.5 \times 10^3$ m/sec including effect of silver ink of 5–7 $\mu$m on both sides.

Y; Young's modulus of film with electrode p; density of film with electrode

The wavelength in air is given by $\lambda = V_s/f$, $V_s = 344$ m/sec in air at resonance $f = of$, $\lambda = V_s/of = (2\Pi R V_s/\sqrt{Y/p})$ or approximately 1.4 R, and $of = Vs/1.4 R$.

The wavelength $\lambda$ is proportional to R (radius of the cylinder) and the directivity pattern in the horizontal direction is determined by $\lambda/w$. Therefore, the beam angle of directivity is determined by w/R, which is determined by the shape. Since w is in the range less than $\Pi R$, FIGS. 5, 6, and 7 can be applied to any other frequencies if w/R is the same.

For example, in FIGS. 5, 6 and 7 then become $f_0 = 41$ KHz, R=6 mm, f=27, 41 and 62 KHz.

Note that in order to effectively excite the resonance mode, the entire electrode area should be excited even though only a partial area is exposed in air for radiation.

Figure 8A:
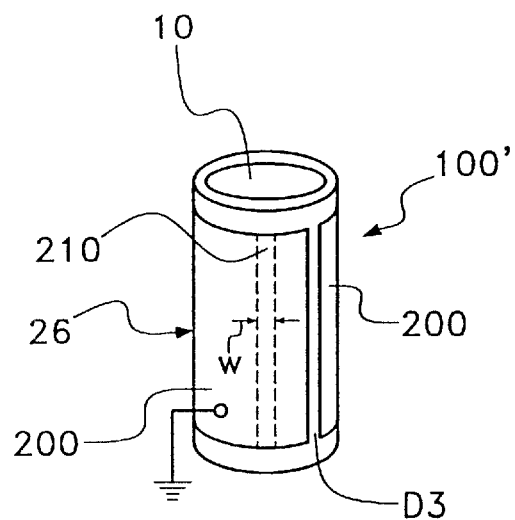
FIG. 8A illustrates a cylindrical transducer operable as a receiver and having an active electrode layer strip on the interior of the piezo film in accordance with the present invention.
Figure 8B:
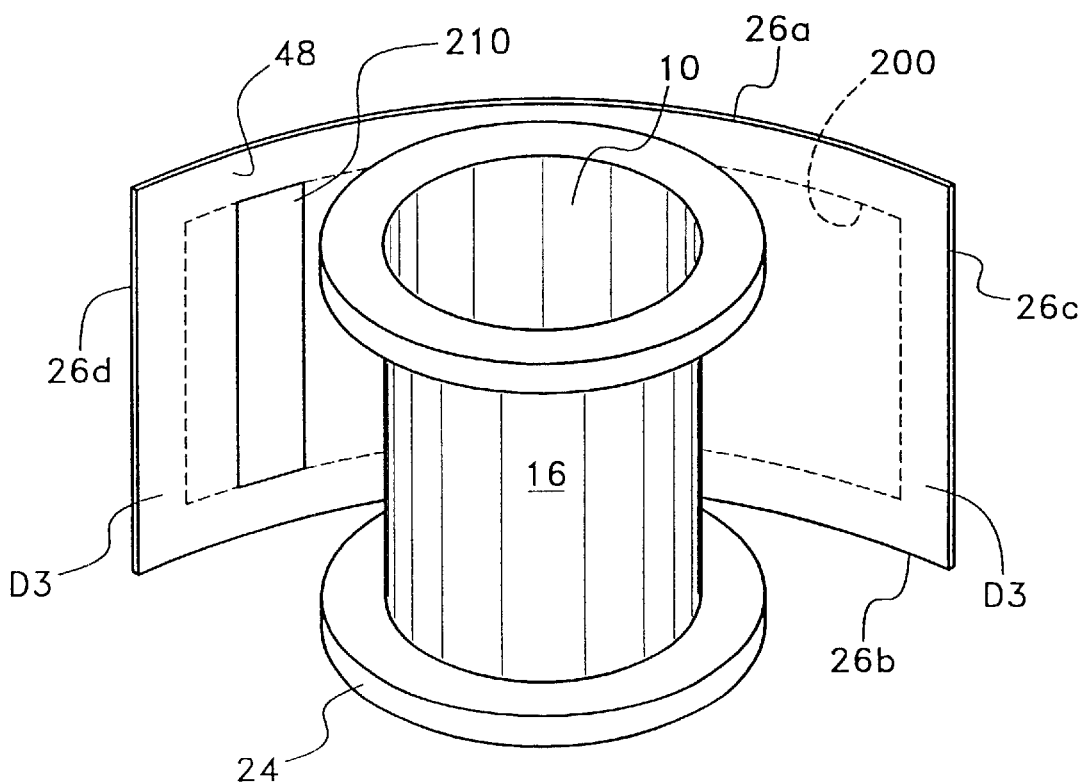
FIG. 8B illustrates an exploded view of the transducer of FIG. 8A showing the interior of the piezo film on which is disposed the active electrode layer strip in accordance with the present invention.
Figure 8C:
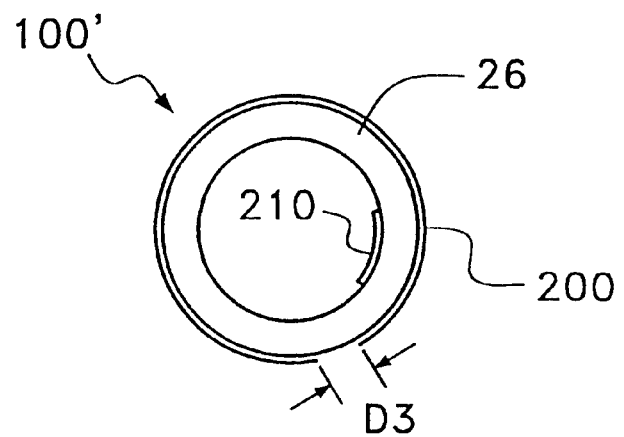
FIG. 8C illustrates a top view of the transducer of FIG. 8A.

Referring now to FIGS. 8A–C, there is depicted a cylindrical transducer operable as a receiver 100' for receiving an acoustic signal and generating an output signal in response thereto in accordance with the present invention. The receiver 100' comprises a cylindrical layer of PVDF film 26 and a first electrode layer 200 disposed on the outer surface of the film. A second active electrode layer 210 (represented in dashed lines in FIG. 8A) is disposed on only a portion of the inner surface of the film for generating a voltage in response to an incident acoustic signal. In this manner, by forming an active electrode area 210 or strip on only a portion of the cylindrical receiver structure, the sensitivity of the receiver is greatly increased. The reason is the signal phases at the front and sides of the cylindrical receiver are different ($\lambda \approx 1.4$ R at resonance). If all the area is covered by the second electrode, voltage generated at each point has different phase angle and these are cancelled. In addition, because the capacitance C is proportional to the area, and since Q=CV, decreasing the area decreases the capacitance C, resulting in an increase in the sensitivity of the receiver for a given input signal voltage. In a preferred embodiment, the outer electrode layer 200 which is connected to ground line covers virtually the entire outer surface of the PVDF film and is coupled to ground to provide enhanced immunity to noise. Note that the electrode layer 210 has a maximum width W which is less than one half the radius of the cylinder. In a preferred embodiment, a 40 KHz receiver has a width of substantially ⅛ that of the cylinder.

Figure 9A:
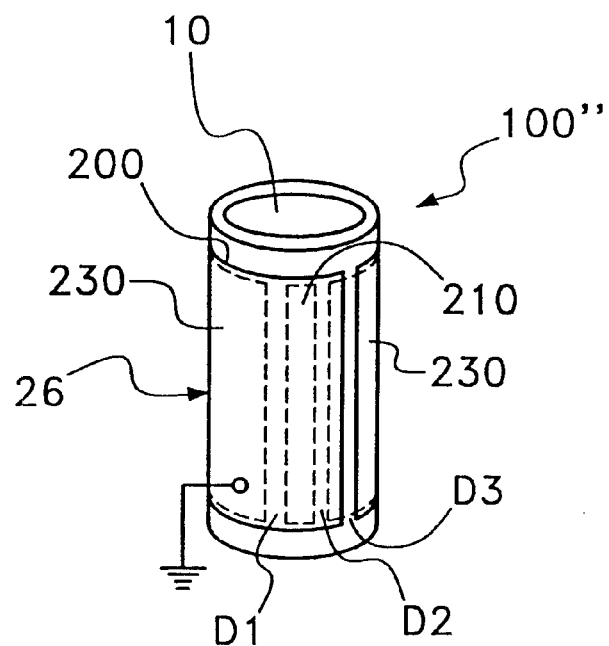
FIG. 9A illustrates an alternative embodiment of the receiver of FIG. 8A showing an active electrode layer strip and dummy electrode layer disposed on the interior surface of a cylindrical piezo film material.
Figure 9B:
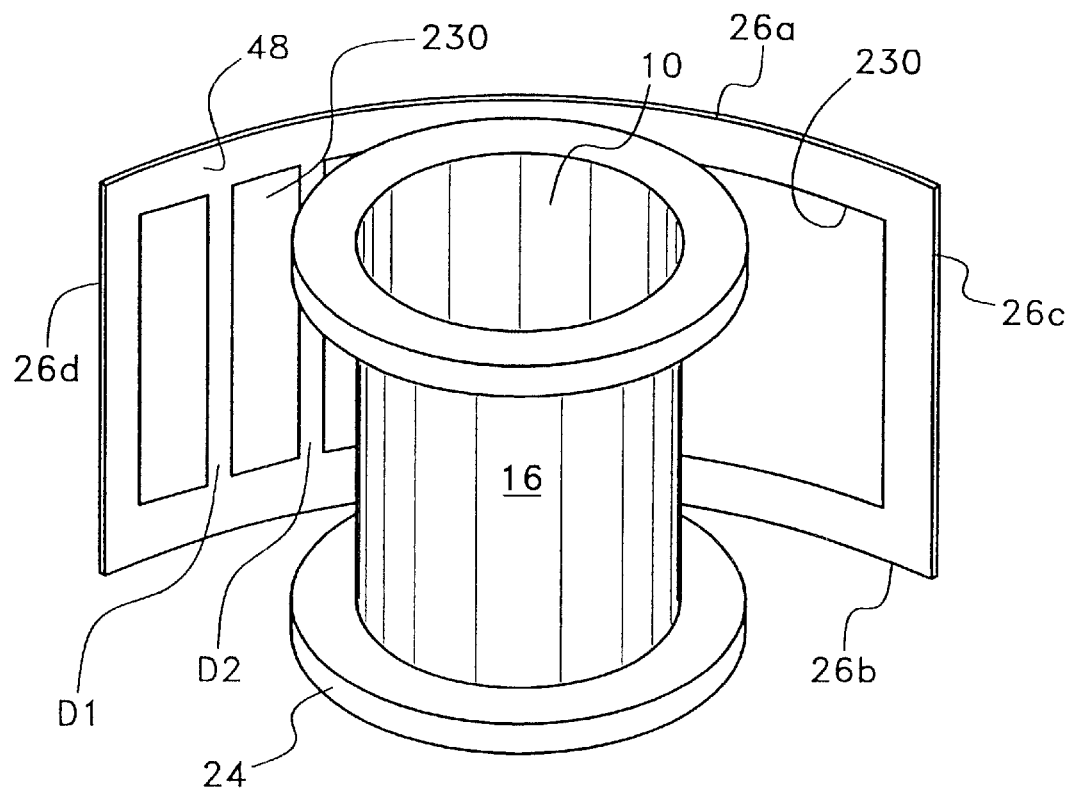
FIG. 9B illustrates an exploded view of FIG. 9A showing the interior of the piezo film on which is disposed the active electrode layer strip and dummy electrode layer in accordance with the present invention.
Figure 9C:
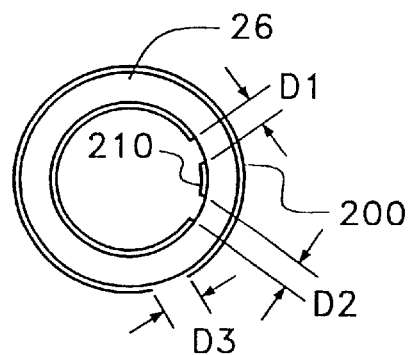
FIG. 9C illustrates a top view of the transducer of FIG. 9A.

FIG. 8B illustrates the surface characteristics of the PVDF film 26 comprising an electrode area 200 formed over substantially the entire outer surface thereof (shown in dashed lines) and an active electrode layer area 210 disposed on the inner surface of PVDF film 26. Note that in order to prevent shorting at the overlapped lateral ends 26c, 26d of the film 26, a portion of the electrode material is removed from the outer surface of the film 26 to provide a non-electrode area 48. Likewise, the electrode material is removed from the upper and lower longitudinal edges 26a, 26b of the film in order to eliminate shorting from surface to surface. The film 26 is then overlapped at the non-electrode areas 48 and secured by means of adhesive such as sticky tape or ultrasonic bonding or a combination or screws or deformable nails occurring at the overlapped areas. Preferably, the inner surface includes a dummy electrode layer 230 covering portions of the interior surface of the PVDF film not covered by the active electrode layer 210 in order to equalize the weight distribution (between the outer surface-which is substantially covered by the electrode layer 200 and the inner surface covered substantially by the combination of active layer 200 and dummy electrode layer 230) and provide more uniform vibration of the receiver. FIGS. 9A–C illustrate such a configuration. Note that while the active electrode layer is shown in the interior of the cylindrical receiver, it is to be understood that the electrode layers may be reversed such that layer 210 (and corresponding dummy electrode layer 230) may be formed on the outer surface while layer 200 is disposed on the inner surface of PVDF 26.

As best shown in FIG. 9B, the active electrode layer 210 is electrically isolated from dummy electrode layer 230 via gaps D1 and D2. Outer electrode layer 200 is substantially uniform around the entire outer surface of the PVDF film except for the overlap region D3 necessary for bonding the transducer in the cylindrical configuration.

Figure 10A:
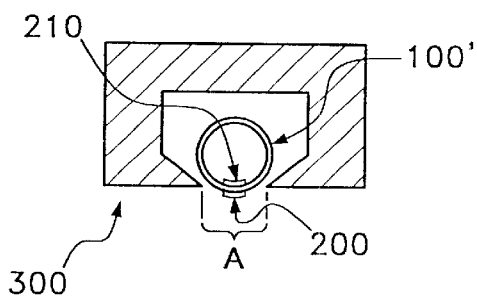
FIGS. 10A–10D illustrate embodiments of a receiver having a housing for controlling beam angle according to an aspect of the present invention.

As shown in FIGS. 10A through 10D, the angle of the received signal may be controlled by including a housing or cover 300 having an aperture A which limits the angle of an incident acoustic signal onto the receiver. As shown in FIG. 10A, the aperture A is disposed such that the aperture is aligned with and has a width slightly greater than the active electrode area 210. The housing or cover 300 surrounds the PVDF cylindrical receiver 100' and operates to restrict propagation of an ultrasonic wave form incident onto the transducer. The housing may be made of any solid material that does not allow propagation of these waves, such as plastic, metal, wood or other solid material.

Figure 10B:
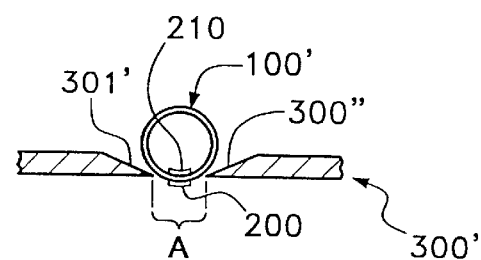
Figure 10C:
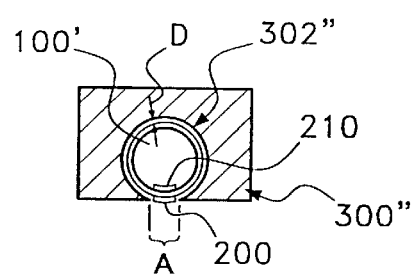
Figure 10D:
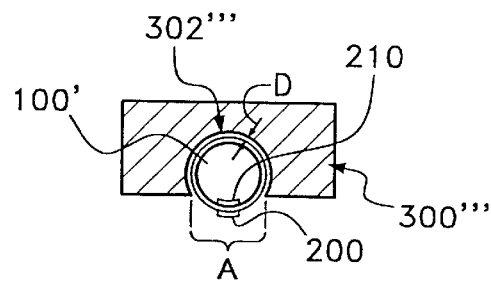

FIG. 10B illustrates an alternative housing design 300' for controlling the transducer beam angle received by receiver apparatus 100'. As shown in FIG. 10B, cover 300' operates as a substantially planar member having taper portions 301' and 302' adjacent the cylindrical receiver for controlling and limiting the receiving beam angles. FIGS. 10C and 10D represent alternative design covers 300" and 300''' respectively, which surround a substantial portion of the cylindrical receiver 100', and which have an interior surface (302" and 302''') contoured to the cylindrical shape of the receiver. Preferably the distance d between the receiver and the interior surface should be minimized so as to avoid undesirable reflections. Note that in each of FIGS. 10A–10D, the aperture is sized sufficiently to avoid undesired reflections resulting from signals passing through the aperture A and reflected for example, from one portion of the housing onto a portion of the receiver such that the acoustic signal would be influenced by the reflections. Note further that while FIGS. 10A–10D illustrate electrode layers 200 and 210 disposed on only a portion of the respective outer and inner surfaces respectively of the PVDF film, it is of course understood that the electrode material 200 may be distributed substantially uniformly over virtually the entire outer surface of the film. In addition, a dummy electrode layer isolated from electrode layer 210 may also be disposed within the inner surface of the PVDF film to provide more uniform weight distribution and uniform vibration, as previously discussed.

Figure 11:
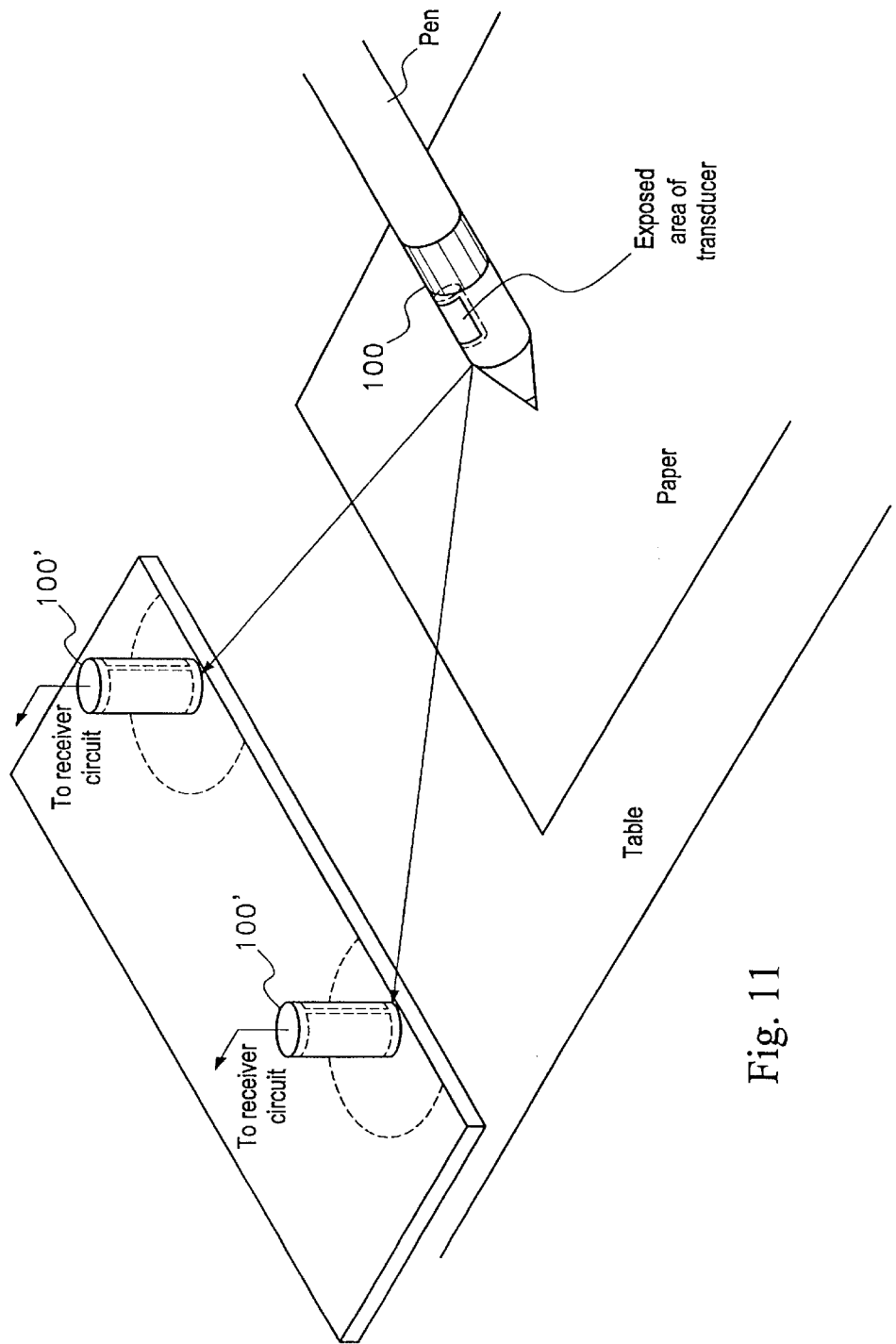
FIG. 11 illustrates an application of the transducer structure embodied in the present invention.

The transducers having the aforementioned features may be applied to a pen position sensor system. If operated at a lower frequency, such as 40–50 KHz is used, the radius R=8~11 mm and it is possible to wrap PVDF film directly on a pen. In this case, omni directional transducer has some advantage of non-restriction of holding direction with regards to pen axis (pen generates acoustic wave omni-directionally so that axial symmetric pen is acceptable). However, since higher resolution of pen motion detection is desirable, operational frequency has to be chosen to be higher (80–160 kHz). In this case, the diameter of cylindrical PVDF film becomes much smaller (2.5–5 mm). As shown in FIG. 11, two receivers 100' with cylindrical PVDF film are disposed at fixed position with the exposed area facing towards the paper on which pen is moving for receiving signals resulting from the transducer transmitter device mounted onto the pen.

Figure 12:
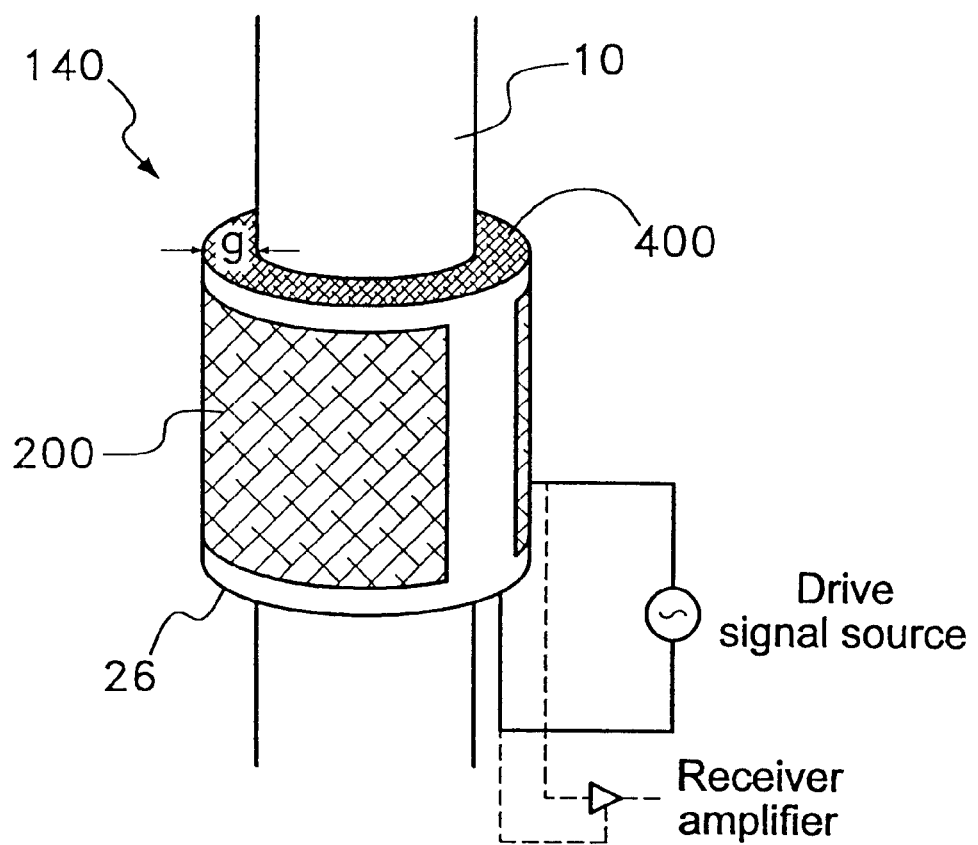
FIG. 12 illustrates the structure of the wideband transducer according to an aspect of the present invention.
Figure 13:
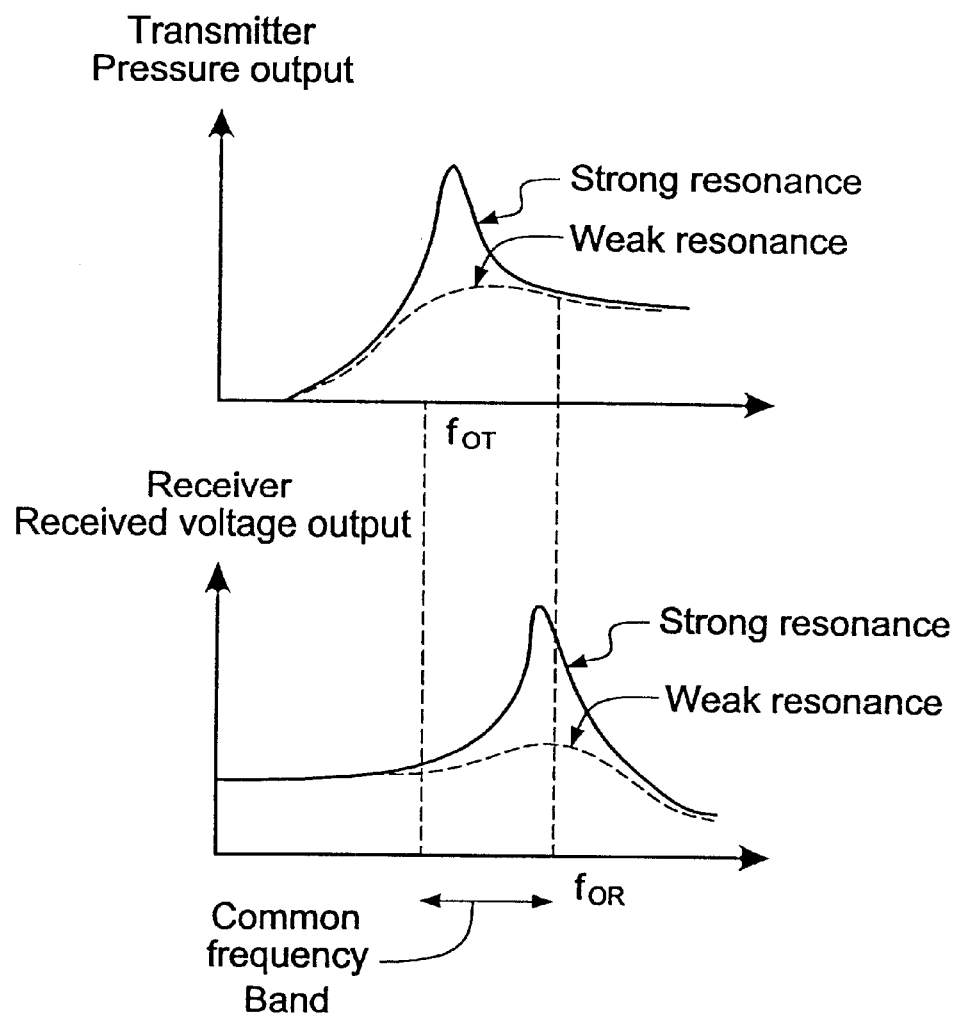
FIG. 13 provides an exemplary illustration of the frequency response associated with the wideband transducer structure combination of transmitter and receiver according to an aspect of the present invention.

The above identified features are also useful in formation of a wideband transducer 140 where the PVDF film 26 is wrapped onto a cylindrical frame 10 with a gap. When this gap is filled by a soft material 400 such as polyurethane foam, cloth, paper etc., the resonance becomes broader. FIG. 12 illustrates the structure of the wideband transducer. Generally, as shown in FIG. 13, the frequency response of the transmitter extends more than resonance frequency $f_{TO}$ and to damped resonance makes useful band higher than $f_{TO}$. In a preferred embodiment, the Q factor is diminished to approximately 3. On the contrary, frequency response of a receiver extends lower side of $f_{OR}$, and damped resonance makes useful frequency band lower than $f_{OR}$. Therefore, when the transmitter and receiver are used for a common signal, choosing $f_{OR} < f_{OR}$ makes common useful frequency band.

While the foregoing invention has been described with reference to the above embodiments, various modifications and changes can be made without departing from the spirit of the invention. Accordingly, all such modifications and changes are considered to be within the scope of the appended claims.

What is claimed is:

1. An ultrasonic receiver comprising:

a curved piezoelectric film having a first surface and a second surface opposite the first surface;

a first electrode layer disposed on substantially the entire first surface of the film a second electrode layer disposed on a minority portion of the second surface of the film and defining an active electrode area responsive to an acoustic signal incident on the piezoelectric film for generating an output signal indicative of the incident acoustic signal; and a third layer of material disposed on a majority of the remainder of the second surface to equalize the weight distribution between the first surface covered substantially by the first electrode layer and the second surface covered substantially by the combination of the second electrode layer and the third layer.

2. The receiver of claim 1, wherein the second electrode layer is electrically separated from the third layer of material.

3. The receiver of claim 1, wherein the third layer of material is an electrode layer.

* * * * *